United States Patent
Tanuku et al.

(10) Patent No.: US 11,983,062 B2
(45) Date of Patent: May 14, 2024

(54) POWER CONTROL FOR A DECODER

(71) Applicant: QUALCOMM Incorporated, San Diego, CA (US)

(72) Inventors: Ravi Kishore Tanuku, Hyderabad (IN); Ravi Shankar Kadambala, Hyderabad (IN); Tony Lijo Jose, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 17/815,254

(22) Filed: Jul. 27, 2022

(65) Prior Publication Data

US 2024/0036630 A1 Feb. 1, 2024

(51) Int. Cl.
*G06F 1/3296* (2019.01)
*G06F 13/42* (2006.01)

(52) U.S. Cl.
CPC ........ *G06F 1/3296* (2013.01); *G06F 13/4282* (2013.01)

(58) Field of Classification Search
CPC .......... G06F 13/4068; G06F 13/4282
See application file for complete search history.

(56) References Cited

U.S. PATENT DOCUMENTS

| | | | |
|---|---|---|---|
| 10,841,355 B2* | 11/2020 | Sengoku | H04L 65/61 |
| 11,678,042 B2* | 6/2023 | Kadambala | G09G 3/3644 |
| | | | 348/333.01 |
| 2010/0049048 A1* | 2/2010 | Miyachi | G01S 7/52034 |
| | | | 600/443 |
| 2016/0217548 A1* | 7/2016 | Yun | G06T 3/4015 |
| 2018/0368112 A1* | 12/2018 | Sebeni | H04W 76/28 |
| 2019/0332558 A1* | 10/2019 | Goel | H04L 47/41 |
| 2022/0231829 A1* | 7/2022 | Park | H03L 7/0802 |

FOREIGN PATENT DOCUMENTS

WO 2022121988 A1 6/2022

OTHER PUBLICATIONS

International Search Report and Written Opinion for International Patent Application No. PCT/US2023/023832, mailed Sep. 22, 2023, 11 pages.

\* cited by examiner

*Primary Examiner* — Brian T Misiura
(74) *Attorney, Agent, or Firm* — W&T/Qualcomm

(57) ABSTRACT

Systems and method for power control for a decoder are disclosed. In one aspect, a decoder for a communication bus is put into a sleep or low power mode when the bus is idle such as when blanking information is sent over a camera serial interface (CSI) bus. By alerting the decoder that there is an opportunity for low power operation, power consumption may be reduced and, particularly for battery operated mobile devices, a time to recharge metric may be improved, which improves the user experience.

20 Claims, 5 Drawing Sheets

POWER CONTROL FOR A DECODER

BACKGROUND

I. Field of the Disclosure

The technology of the disclosure relates generally to power consumption control in a communication bus, and particularly on buses configured to use the camera serial interface (CSI) standard promulgated by MIPI.

II. Background

Computing devices abound in modern society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences. With the advent of the myriad functions available to such devices, there has been increased pressure to find ways to reduce power consumption. Finding new ways to reduce power consumption provides opportunities for innovation.

SUMMARY

Aspects disclosed in the detailed description include systems and methods for power control for a decoder. In particular, a decoder for a communication bus is put into a sleep or low-power mode when the bus is idle such as when blanking information is sent over a camera serial interface (CSI) bus. By alerting the decoder that there is an opportunity for low-power operation, power consumption may be reduced and, particularly for battery-operated mobile devices, a time to recharge metric may be improved, which improves the user experience.

In this regard in one aspect, an integrated circuit (IC) circuit is disclosed. The IC includes a bus interface configured to be coupled to a communication bus. The IC also includes a decoder coupled to the bus interface and configured to decode data sent over the communication bus through the bus interface in a frame. The IC also includes a control circuit coupled to the bus interface and the decoder. The control circuit is configured to instruct the decoder to enter a low-power mode for at least a portion of a blanking interval within the frame.

In another aspect, a method of controlling power consumption is disclosed. The method includes receiving data in a frame containing a blanking interval. The method also includes instructing a decoder to enter a low-power mode during at least a portion of the blanking interval.

DETAILED DESCRIPTION

Figure 1:
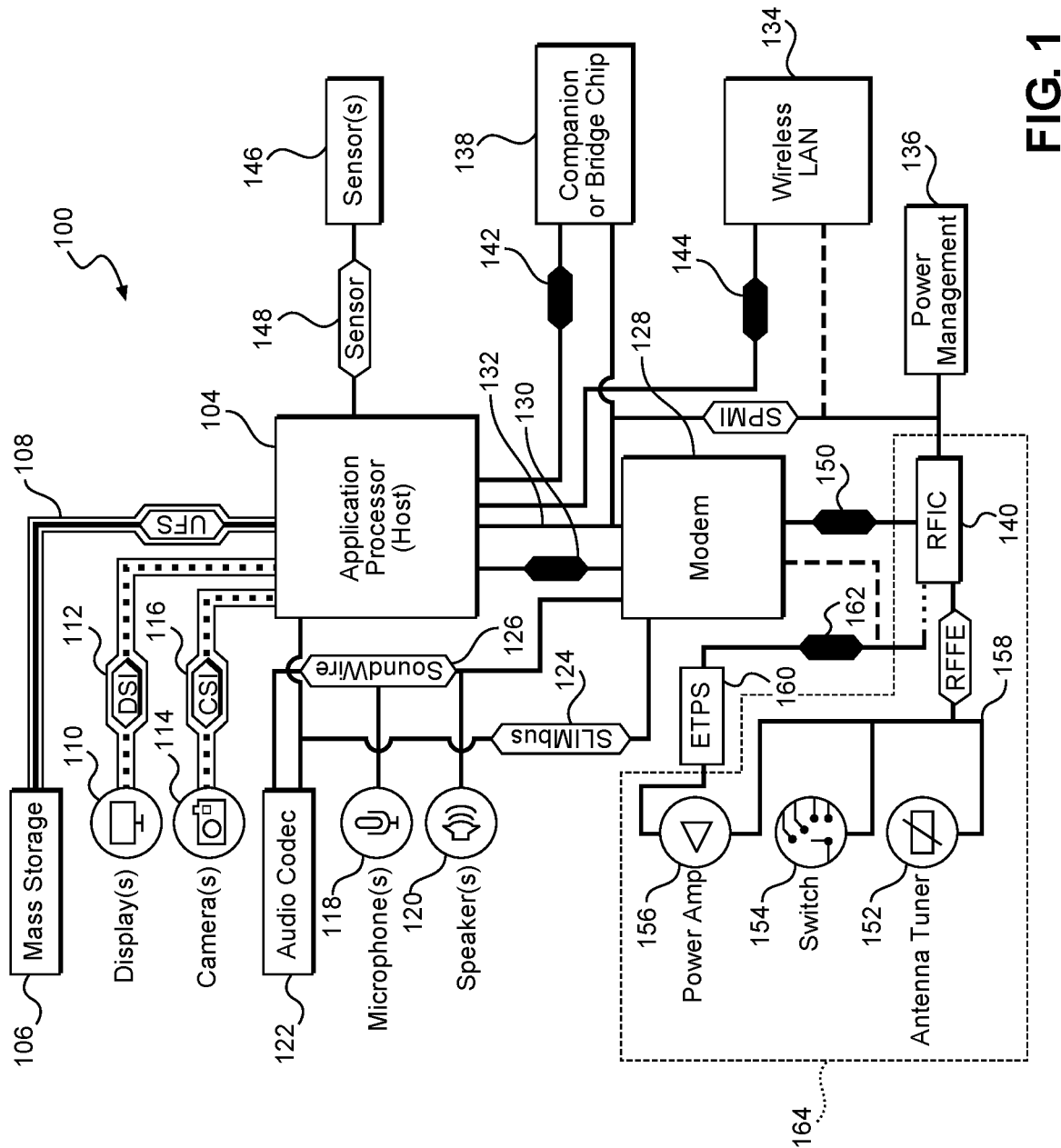
FIG. 1 is a block diagram of a mobile terminal that has a variety of communication buses therein.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for power control for a decoder. In particular, a decoder for a communication bus is put into a sleep or low-power mode when the bus is idle such as when blanking information is sent over a camera serial interface (CSI) bus. By alerting the decoder that there is an opportunity for low-power operation, power consumption may be reduced and, particularly for battery-operated mobile devices, a time to recharge metric may be improved, which improves the user experience.

While exemplary aspects of the present disclosure are well suited for a CSI bus under the current MIPI standard (e.g., CSI-2 version 4, published to MIPI members December 2021), the present disclosure is not so limited, and other buses that have continuously active decoders may also benefit from the present disclosure. In this regard, FIG. 1 illustrates a system-level block diagram of an exemplary mobile terminal 100 such as a smart phone, mobile computing device tablet, or the like that includes a plurality of communication buses. The mobile terminal 100 includes an application processor 104 (sometimes referred to as a host) that communicates with a mass storage element 106 through a universal flash storage (UFS) bus 108. The application processor 104 may further be connected to a display 110 through a display serial interface (DSI) bus 112 and a camera 114 through a CSI bus 116. The application processor 104 may be an integrated circuit (IC) and include an image serial processor (ISP, better described below with reference to FIG. 2) to assist in processing signals associated with the CSI bus 116. Various audio elements such as a microphone 118, a speaker 120, and an audio codec 122 may be coupled to the application processor 104 through a serial low-power interchip multimedia bus (SLIMbus) 124. Additionally, the audio elements may communicate with each other through a SOUNDWIRE bus 126. A modem 128 may also be coupled to the SLIMbus 124 and/or the SOUNDWIRE bus 126. The modem 128 may further be connected to the application processor 104 through a peripheral component interconnect (PCI) or PCI express (PCIe) bus 130 and/or a system power management interface (SPMI) bus 132.

With continued reference to FIG. 1, the SPMI bus 132 may also be coupled to a local area network (LAN or WLAN) IC (LAN IC or WLAN IC) 134, a power management integrated circuit (PMIC) 136, a companion IC (sometimes referred to as a bridge chip) 138, and a radio frequency IC (RFIC) 140. It should be appreciated that separate PCI buses 142 and 144 may also couple the application processor 104 to the companion IC 138 and the WLAN IC 134. The application processor 104 may further be connected to sensors 146 through a sensor bus 148. The modem 128 and the RFIC 140 may communicate using a bus 150.

With continued reference to FIG. 1, the RFIC 140 may couple to one or more RFFE elements, such as an antenna tuner 152, a switch 154, and a power amplifier 156 through a radio frequency front end (RFFE) bus 158. Additionally, the RFIC 140 may couple to an envelope tracking power supply (ETPS) 160 through a bus 162, and the ETPS 160 may communicate with the power amplifier 156. Collectively, the RFFE elements, including the RFIC 140, may be considered an RFFE system 164.

Figure 2:
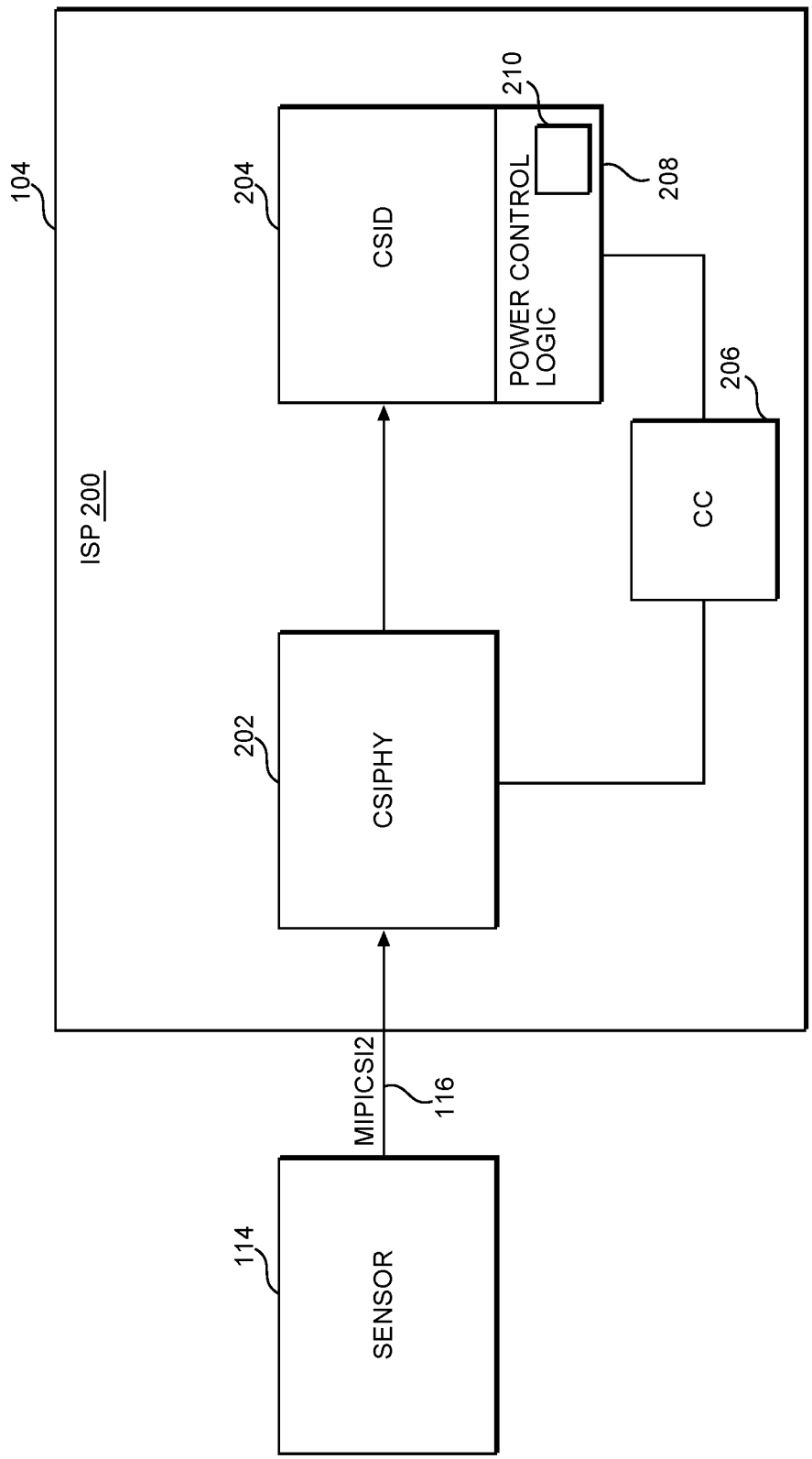
FIG. 2 is a more detailed block diagram of a sensor and a processor connected by a communication bus such as could be found in the mobile terminal of FIG. 1.

As noted, the application processor 104 may include an ISP 200, better illustrated in FIG. 2. Alternatively, the ISP 200 may be separate and distinct from the application processor 104 (or may be integrated into some other IC such as the modem 128). The ISP 200 may include a physical layer (PHY or CSIPHY) 202 that is configured to couple to the CSI bus 116 and, as such, may be referred to as a bus interface. The camera 114 is coupled to the other end of the CSI bus 116. The PHY 202 may send received signals to a decoder 204 (also referred to as a CSI decoder or CSID). A control circuit 206 may be coupled to both the PHY 202 and the decoder 204 and more specifically to a power control logic circuit 208 within or associated with the decoder 204. The power control logic circuit 208 may include registers 210 into which operational parameters may be written by the control circuit 206. Alternatively, the registers 210 may be within the decoder 204. Note that the camera 114 may also have registers (not shown) to which the CSI drivers write operational parameters. Further, while the above discussion refers to registers 210, it may be a single register 210 or at least one register 210.

Figure 3:
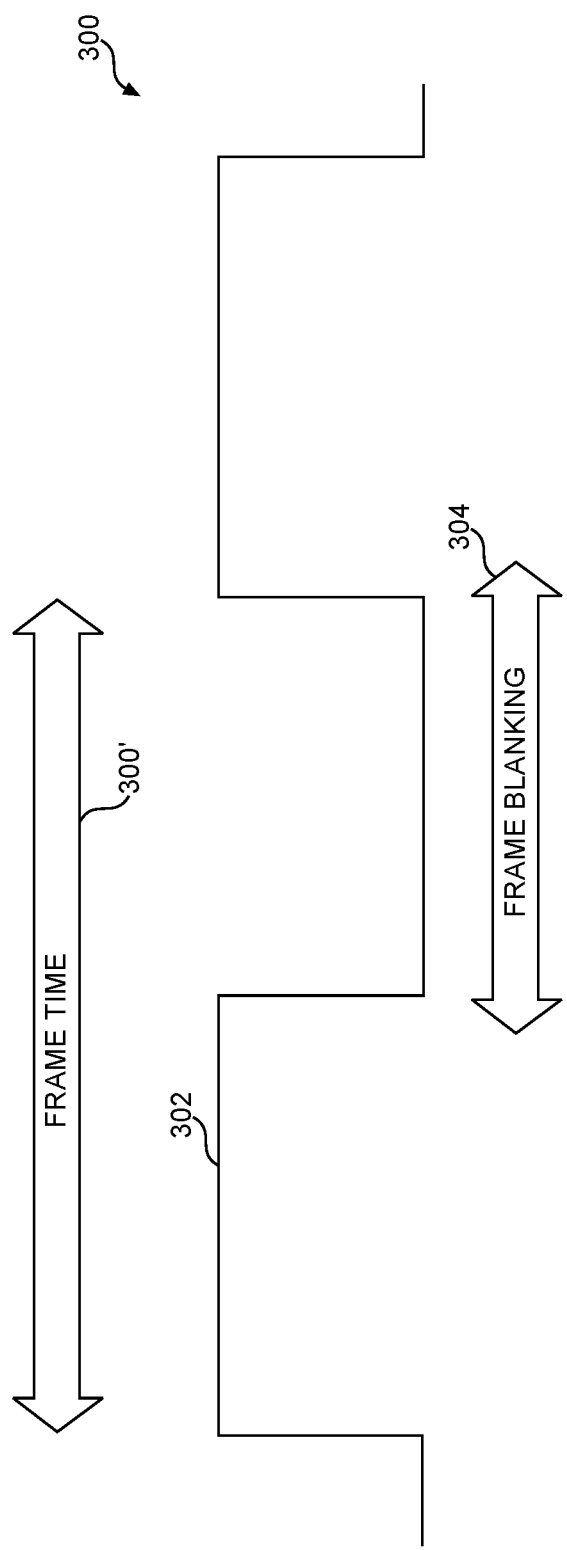
FIG. 3 is a signal diagram of an exemplary frame being sent over the communication bus of FIG. 2.

In use, a sensor, such as the camera 114 may collect data (e.g., taking a picture or video) using operational parameters stored in the local registers and encode the data using MIPI CSI hardware which encodes and transmits the data through data lanes in the CSI bus 116 according to the MIPI CSI standard. The camera 114 may stream data and use blanking (no data) to control exposure and frame rate as better seen in FIG. 3. Specifically, within a frame 300 having a frame window 300', there is an active portion 302 and an inactive or frame blanking portion 304. The CSI standard allows the camera 114 to shift data lanes intelligently to a low-power-consuming mode (LPM) whenever there is blanking. Additionally, the CSI standard allows for the PHY 202 to follow the LPM transitions and also enter a low-power mode.

Figure 4:
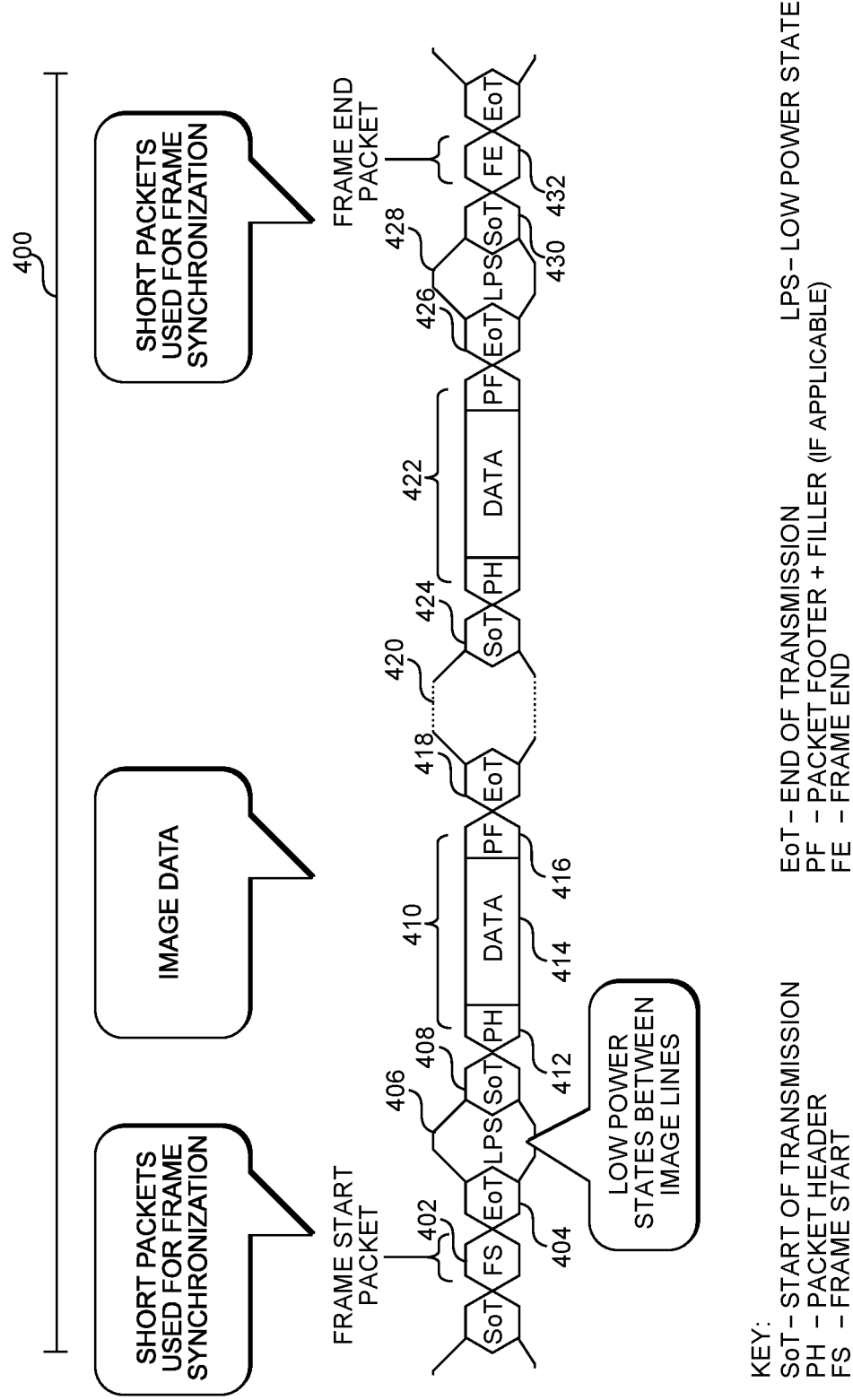
FIG. 4 is a more detailed view of the frame of FIG. 3 showing low-power states for the communication bus.

A better view of a frame in a CSI message is shown in FIG. 4, where a frame 400 begins with a frame start (FS) packet 402, followed by an end-of-transmission (EoT) symbol 404. After the EoT symbol 404, a low-power state (LPS) portion 406 between image lines is present. At some point, a start-of-transmission (SoT) symbol 408 is sent, followed by a packet 410. The packet 410 includes a packet header (PH) 412, data 414, and a packet footer (PF) 416. After the packet 410, another EoT symbol 418 is sent followed by another LPS portion 420. Subsequent packets such as last packet 422 are preceded by an SoT symbol 424 and followed by an EoT symbol 426. The end of the frame may include a final LPS portion 428, an SoT symbol 430 and a frame end (FE) symbol 432. Note that FIG. 4 comes from the MIPI specification for CSI-2 version 4, published December 2021.

However, conventional systems do not communicate blanking information to the decoder, and, in conventional systems, the decoder has to clock continuously. Such always on operation along with use of the clock consumes power without purpose. Such power consumption may lead to more frequent battery charging by the user (i.e., a generally unwelcome situation) and/or may cause battery levels to dip to levels which degrade the user experience (i.e., also unwelcome). Accordingly, such operation is open to innovation.

Exemplary aspects of the present disclosure use the control circuit 206 to use the power control logic circuit 208 to move the decoder 204 into a low-power mode during blanking intervals. Specifically, the control circuit 206 or software used by the control circuit 206 may determine a blanking interval for the sensor of the camera 114 and share this information with the decoder 204 such as by storing the operational parameters in the registers 210. Based on these operational parameters, the decoder 204 may enter a low-power mode for at least a portion of the blanking interval. In an exemplary aspect, less than the entirety of the blanking interval is spent in the low-power mode so as to allow for time to wake back up and settle in an active mode before the next data sequence to be decoded.

Figure 5:
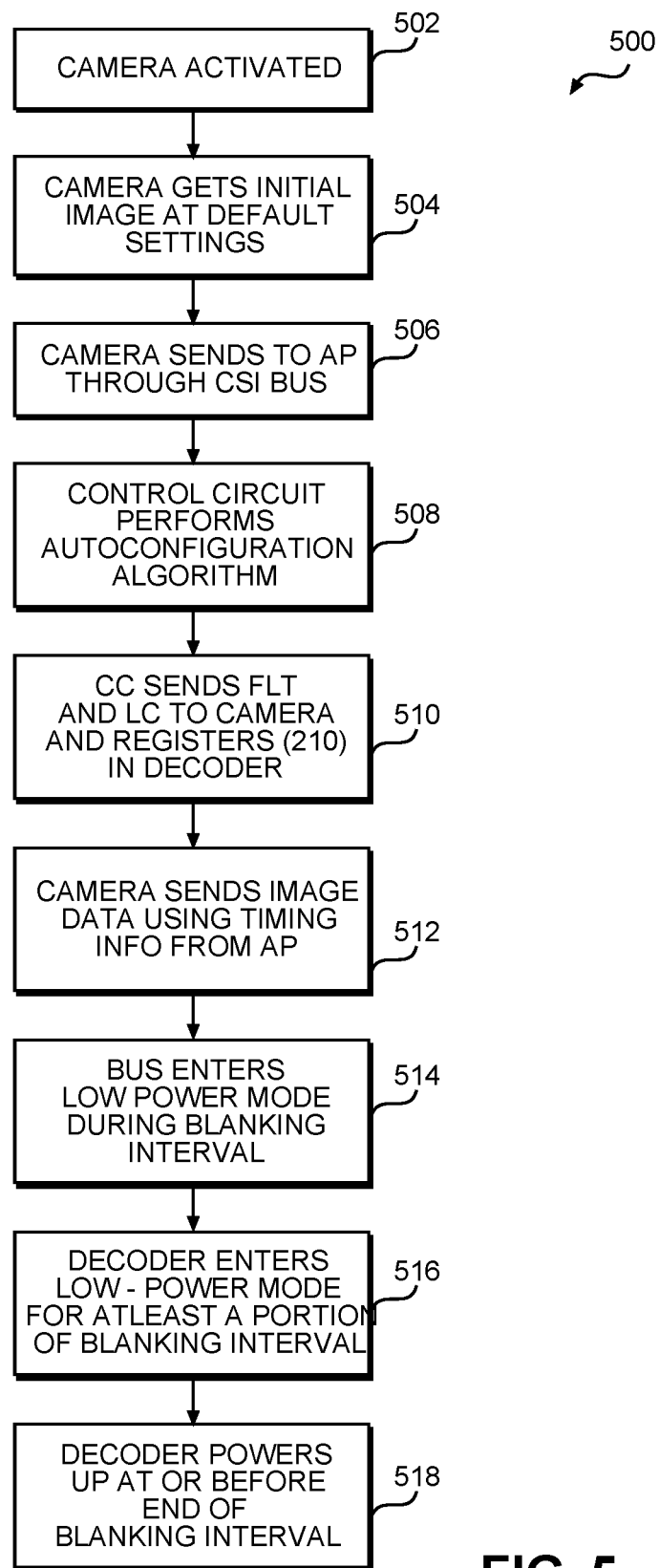
FIG. 5 is a flowchart illustrating an exemplary process for detecting a low-power state on the communication bus and placing a decoder in a low-power state according to exemplary aspects of the present disclosure.

FIG. 5 illustrates a process 500 for providing power savings on a bus according to exemplary aspects of the present disclosure. In this regard, the process 500 begins when a remote sensor or camera 114 is activated (block 502) such as by turning on the camera 114. The sensor is remote in the sense that it is not part of the application processor 104, although it is likely in the same device (e.g., a camera in a phone). The user may activate the camera 114 in an attempt to secure a photo or video, such as by pressing an activation icon or the like. Responsive to such activation, the camera 114 captures an initial image at default settings (block 504) relating to exposure time versus frame length. For example, a default frame length may be thirty-three milliseconds (33 ms) and an exposure length may be 30 ms. The camera 114 sends the data captured to the application processor 104 (and particularly to the ISP 200) through the CSI bus 116 (block 506). The control circuit 206 performs an autoconfiguration algorithm (e.g., using an application specific IC (ASIC) or software) (block 508) to determine an appropriate exposure time relative to a frame rate to achieve a desired amount of captured light (e.g., dim interior lighting may necessitate a longer exposure relative to a brightly lit outside scene). In an exemplary aspect, the frame rate is configured using a framelengthline (FLT) parameter (corresponding to a frame length) and a linecount (LC) parameter (corresponding to an exposure length).

The control circuit 206 sends the operational parameters to the camera 114 and to the registers 210 in the decoder 204 (block 510). The camera 114 captures the image and sends the image data using the operational parameters provided by the application processor 104 (block 512). In most cases, at least some portion of the frame will be a blanking interval, and the CSI bus 116 will enter a low-power mode during the blanking interval (block 514) as dictated by the CSI specification. The decoder 204 also knows the blanking interval and enters a low-power mode for at least a portion of the blanking interval (block 516). The decoder 204 then powers up at or before the end of the blanking interval (block 518) so that it has time for a clock to settle and be ready for the next image data from the camera 114. The time for the clock to settle may form a threshold which is subtracted from the blanking interval to determine how long the decoder 204 is in the low-power mode.

By way of example, a typical frame length may be 33 ms. A typical exposure length for bright light might be 10-15 ms. A typical exposure for dim indoor lighting conditions may be 25-30 ms. Wake up and settling may take approximately 1 ms. Accordingly, almost any normal lighting situation may benefit from aspects of the present disclosure.

As a first variant on the process 500, the control circuit 206 may check the duration of the blanking interval against the amount of time required to wake and settle. When the blanking interval is less than the amount of time required to wake and settle, the control circuit 206 may preclude the decoder 204 from entering a low-power mode.

As a second variant on the process 500, a battery level may be checked during the autoconfiguration algorithm, and a low battery state (e.g., below twenty percent) may cause the autoconfiguration to limit the exposure length to conserve power. Such a battery level override would not only limit the time the CSI bus 116 is active, but also allow the decoder 204 to be in a low-power mode as well, thereby reducing power consumption, albeit potentially at a loss of information in images.

As a variant on the second variant, a user may be provided the ability of override the battery level override. That is, the user may be informed that the battery level is low and the camera settings have been adjusted with the option to accept or decline such adjustments.

As a third variant, there is a movement to compress the time within the frame that is used to transmit the data below the length of the exposure length. For example, if the autoconfiguration algorithm indicates the exposure length is 15 ms, the camera may compress the data transmission to 8 ms to maximize the blanking interval and the time the CSI bus 116 spends in a low-power mode. If the control circuit 206 is aware that the camera 114 uses this compression, the control circuit 206 may store modified values in the registers 210 so that the decoder 204 may also be in low-power modes matching those of the CSI bus 116.

The systems and methods for power control for a decoder according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art will further appreciate that the various illustrative logical blocks, modules, circuits, and algorithms described in connection with the aspects disclosed herein may be implemented as electronic hardware, instructions stored in memory or in another computer readable medium wherein any such instructions are executed by a processor or other processing device, or combinations of both. The master devices, and slave devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an ASIC, a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered aspects/clauses:

1. An integrated circuit (IC) circuit comprising:
   a bus interface configured to be coupled to a communication bus;

a decoder coupled to the bus interface and configured to decode data sent over the communication bus through the bus interface in a frame; and a control circuit coupled to the bus interface and the decoder, the control circuit configured to:
instruct the decoder to enter a low-power mode for at least a portion of a blanking interval within the frame.

2. The IC of clause 1, wherein the bus interface is configured to couple to a camera serial interface (CSI) bus.

3. The IC of clause 1 or 2, wherein the control circuit is further configured to receive an initial image from a remote sensor through the bus interface.

4. The IC of clause 3, wherein the control circuit is further configured to implement an autoconfiguration algorithm with the initial image to determine operational parameters for the remote sensor including a frame length and the blanking interval.

5. The IC of clause 4, wherein the control circuit is further configured to send the operational parameters to the remote sensor.

6. The IC of clause 4 or 5, further comprising a register associated with the decoder and wherein the control circuit is further configured to store the operational parameters in the register.

7. The IC of any of clauses 1 to 6, wherein the portion of the blanking interval comprises an entire blanking interval minus a threshold.

8. The IC of clause 7, wherein the threshold is based on a wake-up time associated with the decoder.

9. The IC of any of clauses 1 to 8, wherein the control circuit is configured to determine the blanking interval based on a battery level.

10. The IC of clause 9, wherein the control circuit is configured to determine the blanking interval based on a user override related to the battery level.

11. A method of controlling power consumption, comprising:
receiving data in a frame containing a blanking interval; and
instructing a decoder to enter a low-power mode during at least a portion of the blanking interval.

12. The method of clause 11, further comprising determining the blanking interval.

13. The method of clause 12, wherein determining the blanking interval comprises using a battery level to determine the blanking interval.

14. The method of clause 12, wherein determining the blanking interval comprises using information associated with an initial image to determine the blanking interval.

15. The method of any of clauses 12 to 14, further comprising sending the blanking interval to a remote sensor.

16. The method of any of clauses 12 to 14, further comprising storing the blanking interval in a register associated with the decoder.

17. The method of any of clauses 11 to 16, wherein receiving the data in the frame comprises receiving through a camera serial interface (CSI) bus.

What is claimed is:

1. An integrated circuit (IC) circuit comprising:
a bus interface configured to be coupled to a communication bus;
a decoder coupled to the bus interface and configured to decode data sent over the communication bus through the bus interface in a frame; and
a control circuit coupled to the bus interface and the decoder, the control circuit configured to:
receive an initial image from a remote sensor through the bus interface;
implement an autoconfiguration with the initial image to determine operational parameters for the remote sensor including a frame length and a blanking interval; and
instruct the decoder to enter a low-power mode for at least a portion of the blanking interval within the frame.

2. The IC of claim 1, wherein the bus interface is configured to couple to a camera serial interface (CSI) bus.

3. The IC of claim 1, wherein the control circuit is further configured to send the operational parameters to the remote sensor.

4. The IC of claim 1, further comprising a register associated with the decoder and wherein the control circuit is further configured to store the operational parameters in the register.

5. The IC of claim 1, wherein the portion of the blanking interval comprises an entire blanking interval minus a threshold.

6. The IC of claim 5, wherein the threshold is based on a wake-up time associated with the decoder.

7. The IC of claim 1, wherein the control circuit is configured to determine the blanking interval based on a battery level.

8. The IC of claim 7, wherein the control circuit is configured to determine the blanking interval based on a user override related to the battery level.

9. A method of controlling power consumption, comprising:
receiving an initial image from a remote sensor through a bus interface;
implementing an autoconfiguration with the initial image to determine operational parameters for the remote sensor including a frame length and a blanking interval;
receiving data in a frame containing the blanking interval; and
instructing a decoder to enter a low-power mode during at least a portion of the blanking interval.

10. The method of claim 9, further comprising determining the blanking interval.

11. The method of claim 10, wherein determining the blanking interval comprises using a battery level to determine the blanking interval.

12. The method of claim 10, wherein determining the blanking interval comprises using information associated with the initial image to determine the blanking interval.

13. The method of claim 10, further comprising sending the blanking interval to the remote sensor.

14. The method of claim 10, further comprising storing the blanking interval in a register associated with the decoder.

15. The method of claim 9, wherein receiving the data in the frame comprises receiving through a camera serial interface (CSI) bus.

16. An integrated circuit (IC) circuit comprising:
a bus interface configured to be coupled to a communication bus;
a decoder coupled to the bus interface and configured to decode data sent over the communication bus through the bus interface in a frame; and
a control circuit coupled to the bus interface and the decoder, the control circuit configured to:
determine a blanking interval based on a user override related to a battery level; and instruct the decoder to enter a low-power mode for at least a portion of the blanking interval within the frame.

17. The IC of claim 16, wherein the bus interface is configured to couple to a camera serial interface (CSI) bus.

18. The IC of claim 16, wherein the portion of the blanking interval comprises an entire blanking interval minus a threshold.

19. The IC of claim 18, wherein the threshold is based on a wake-up time associated with the decoder.

20. The IC of claim 16, wherein the control circuit is further configured to receive an initial image from a remote sensor through the bus interface.

* * * * *